United States Patent Office 3,143,180
Patented Aug. 4, 1964

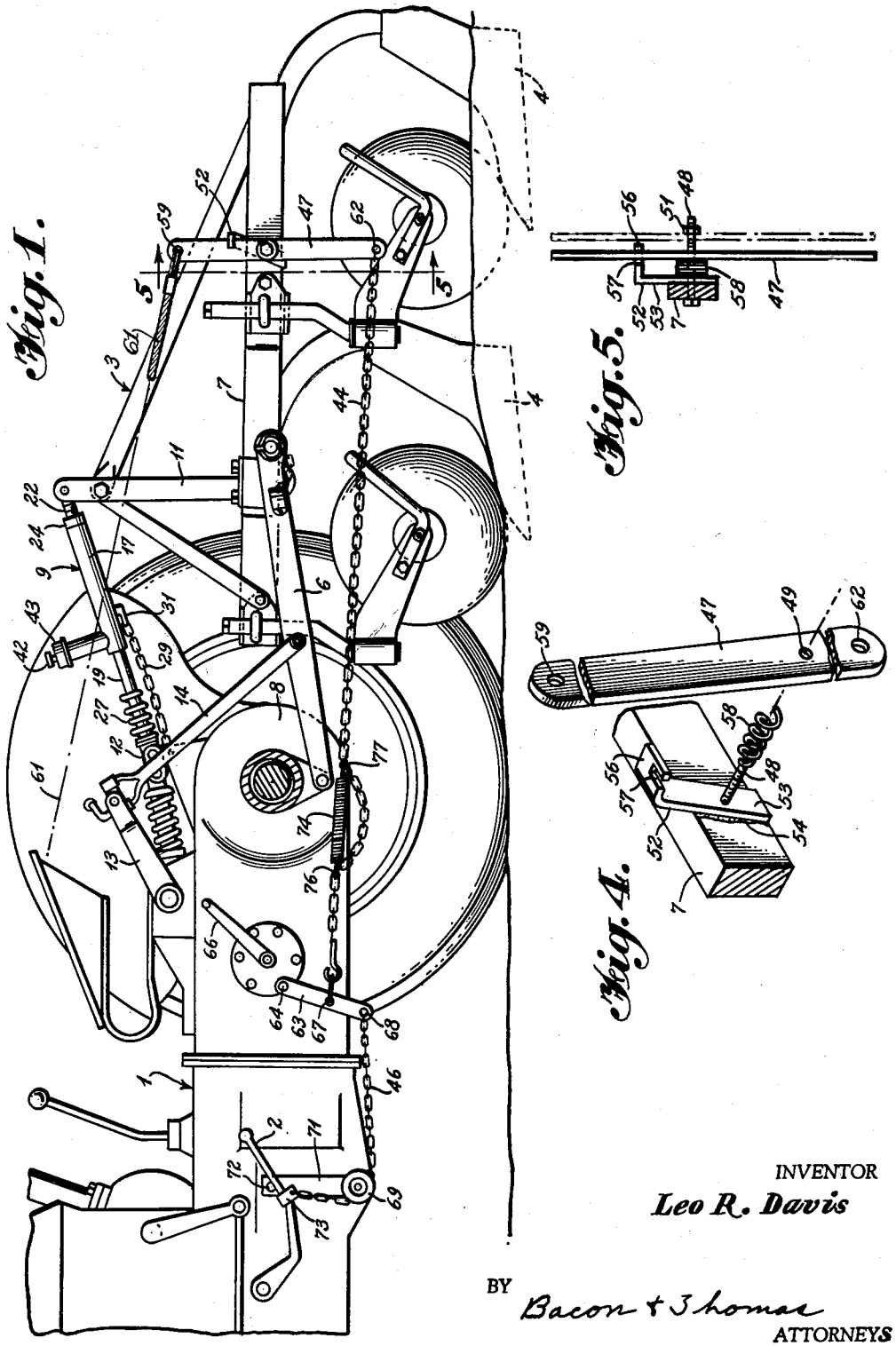

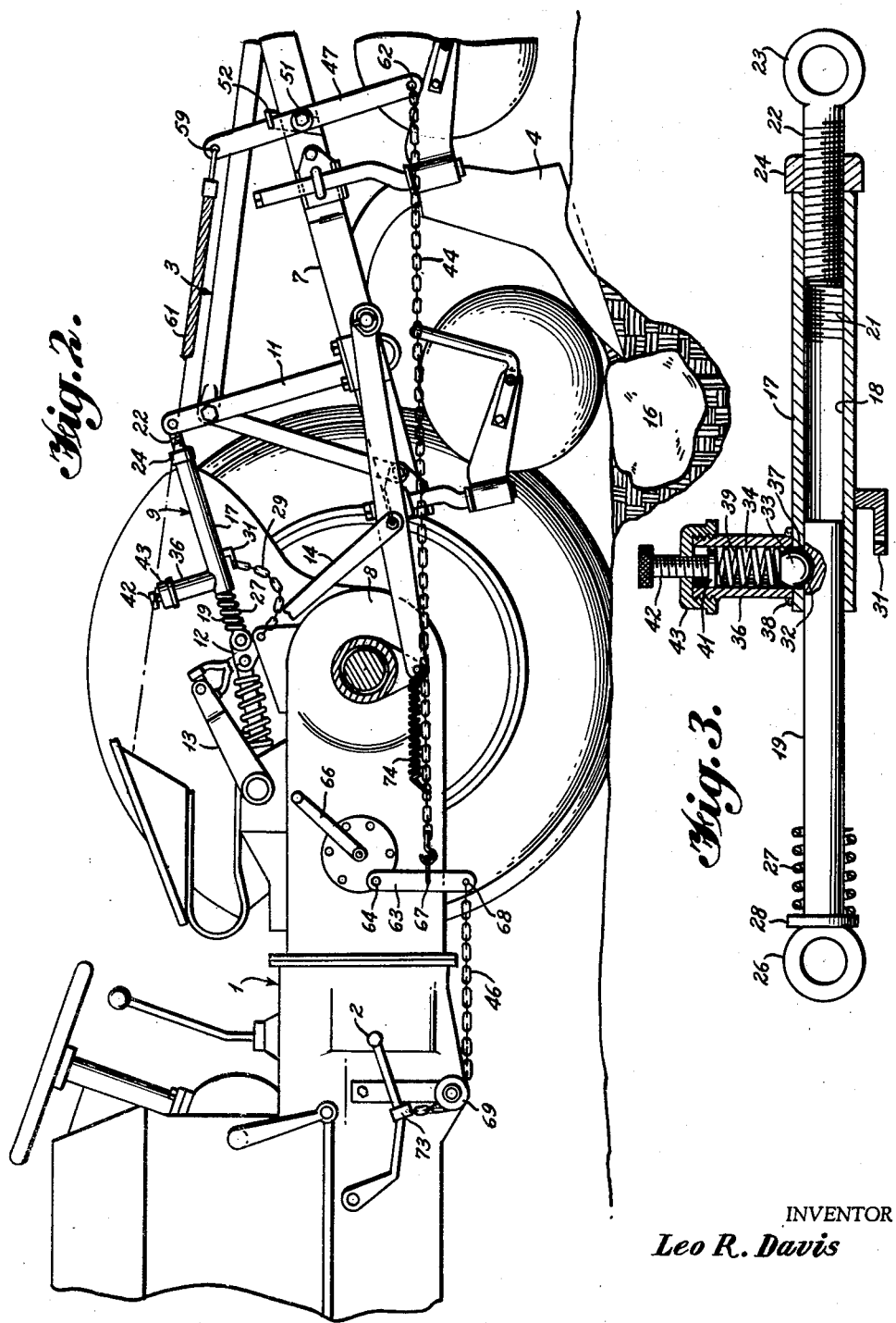

3,143,180
SAFETY DEVICE FOR TRACTORS
Leo R. Davis, Orange Beach, Ala. (Foley, Ala.)
Substituted for abandoned application Ser. No. 458,074, Sept. 24, 1954. This application Apr. 2, 1963, Ser. No. 271,551
4 Claims. (Cl. 180—14.5)

The present invention relates to a safety device for tractors and more particularly to such a device which effects clutch disengagement when an implement attached to the tractor strikes an immovable object.

Many tractors in present day use employ what is generally known as the Ferguson linkage for attaching a plow or other implement to the tractor. This linkage includes a pair of transversely spaced lower draft links and an upper compression link, the implement being secured to the tractor in an unbalanced condition. The forward ends of these links are pivotally connected to the tractor and the rearward ends are pivotally connected to the frame member, which carries the implement.

Hydraulic means, employing hydraulic fluid supplied by a pump driven by the tractor engine, is ordinarily used to lift the implement from a ground engaging or operative position to an elevated or inoperative position and also to regulate the depth of the implement in the ground being plowed or cultivated. Often the depth is automatically regulated through control means, which depends for its action on the resistance to forward travel of the implement in the ground.

In some types of tractors, the pump supplying the hydraulic fluid is operated whenever the tractor motor is running, but in other tractors, it is driven from the lay shaft of the transmission and therefore the hydraulic implement lifting mechanism depends for its operation upon engagement of the vehicle clutch, even when the transmission is in neutral. This factor is of importance in connection with the present invention as will be seen hereinafter.

Various safety features, such as overload release valves, are built into these tractors, but none have been found to accommodate the situation wherein the implement, such as a plow, suddenly strikes an object, for example, a stone or root, which it cannot dislodge. This places a sudden shock on all of the operating parts of the tractor and even, if the tractor engine does not stall, has been known to cause the tractor to tip over backward and kill or injure the operator.

Accordingly, it is the principal object of the present invention to provide a safety device for a tractor having an implement pivotally mounted thereon for vertical swinging movement by upper and lower link members, which will effect immediate declutching of the tractor engine when the implement strikes an object which it cannot dislodge.

Another object of the invention is to provide a safety device which can be easily installed on any existing tractor having the implement attaching linkage described above.

A further object of the invention is to provide a safety device for tractors of the type described which is adjustable to cause clutch disengagement upon attainment of any predetermined compressive force upon the upper link member.

A still further object of the present invention is to provide a safety device for tractors of the type described which permits manual reengagement of the clutch after it has been automatically disengaged by action of the safety device, while the tractor is still immobilized.

Yet another object of the present invention is to provide a safety device which can be economically manufactured.

Other and further objects of the invention will be apparent from the following detailed description of the invention taken in conjunction with the drawings in which:

FIG. 1 is a side elevational view partly in section showing a tractor and implement in normal working position with the present safety device installed thereon;

FIG. 2 is a similar view showing the condition of the safety device and the relative position of the tractor and implement frame after the implement has struck an object which cannot be dislodged;

FIG. 3 is an enlarged sectional view showing the structure of the telescoping upper link member;

FIG. 4 is an enlarged fragmentary exploded view in perspective showing the mechanism for reengaging the clutch when the upper link is in telescoped condition; and FIG. 5 is a sectional view taken on the line 5—5 of FIG. 1 looking in the direction of the arrows and further illustrating the clutch reengaging mechanism.

In the drawings, the numeral 1 generally designates a tractor having the conventional pedal 2 for disengagement of a clutch (not shown). The numeral 3 generally designates the frame carrying an implement such as the plow 4.

The implement frame 3 is pivotally connected to the tractor for vertical swinging movement by means of a pair of lower draft links 6 pivotally connected to a longitudinal frame member 7 and to the differential housing 8 of the tractor but it will be noted that only one of the draft links is shown in the drawings. An upper compression link generally designated by the numeral 9 is pivotally secured at one end to a vertically disposed member 11 of the implement frame 3 and at its other end it is pivotally secured to a bell crank lever 12, which is in turn pivotally secured to the differential housing 8 at a point spaced vertically above the point of connection of the draft links therewith. The construction of the upper link 9 is a very important feature of this invention and will be described in detail hereinafter.

Suitable hydraulic mechanism (not shown) raises and lowers the implement carrying frame through the agency of lever arms 13 and links 14 pivotally secured to the draft links 6, only one half of the lifting linkage being shown in the drawings.

Suitable hydraulic control means (not shown) actuated by forces applied to the bell crank lever 12 through the upper link 9 may be present to maintain the plow at a predetermined depth in the soil being plowed.

In accordance with the present invention, the upper link generally designated by the numeral 9 is constructed so that its effective length is shortened upon being subjected to a predetermined compressive force, such as will be encountered if a plow strikes an immovable object, for example, a boulder 16, thus casing the implement carrying frame 3 to be elevated with respect to the tractor. In a preferred form of the invention, the upper link will comprise a guide tube 17 having a bore 18 therein receiving a rod 19. The end of guide tube 17 remote from that receiving rod 19 is internally threaded, as at 21, to receive a correspondingly threaded post 22 provided with an eye portion 23 for ready attachment by a bolt or other suitable means to the vertical frame member 11 of implement carrying frame 3. A lock nut 24 is provided to maintain threaded post 22 in any adjusted position, the adjustment making it possible to install the link on any existing tractor embodying the described linkage system.

The end of rod 19 remote from that entering tube 17 is likewise provided with an eye portion 26 for ready attachment to the bell crank lever 12.

To absorb any shock resulting from sudden telescoping of the upper link 9, a coil spring 27 surrounds rod 19 and rests on the shoulder formed by an enlarged portion 28 of the rod. To prevent the rod 19 from being completely withdrawn from the tube 17 during normal use, a chain 29 may be secured between an L-shaped bracket 31 on the guide tube 17 and the differential housing 8 of the tractor.

The rod 19 and guide tube 17 are provided with means normally preventing their telescoping. Preferably, the piston is provided with a recess 32 to receive a detent which may comprise a ball 33 slidably mounted in the bore 34 of a housing 36, the bore 34 communicating with bore 18 of tube 17 through an aperture 37 in the wall of the tube adjacent the end receiving rod 19. The housing 36 is secured over aperture 37 by suitable means such as welding, as shown at 38, and is disposed normal to tube 17. A coil spring 39 normally urges ball 33 into recess 32 and the force of spring 39 may be regulated by a movable abutment 41 secured to a post 42 threaded in cover member 43 of housing 36. By screwing the abutment 41 in or out, the upper link 29 can be caused to telescope under the action of any predetermined compressive force.

On telescoping of upper link 9 when the implement strikes an object, which it cannot dislodge, the implement carrying frame 3 will swing upwardly with respect to the tractor. This relative movement is utilized to effect immediate release of the tractor clutch, thus immediately neutralizing any dangerous forces, which would otherwise develop. Movement of the implement frame is preferably transmitted to the clutch pedal 2 by employing an elongated flexible member which may conveniently be a chain. The transmission means includes a first elongated flexible member 44 and a second elongated flexible member 46. One end of flexible member 44 is secured to the lower end of a lever 47 pivotally mounted intermediate its ends on longitudinal frame member 7 by any suitable means such as a bolt 48 passing through an aperture 49. Aperture 49 is made sufficiently large so that lever 47 will slide readily on bolt 48 to permit it limited lateral movement along its pivotal axis, the outer limit of this movement conveniently being defined by a nut 51 threaded on bolt 48. Pivotal movement of lever 47 in a clockwise direction is normally prevented by a stop member 52 of inverted L-shaped configuration which may be secured to longitudinal frame member 7 by any suitable means such as by securing leg portion 53 thereto by welding as shown at 54, leg portion 53 being apertured to allow bolt 48 to pass therethrough. The laterally extending base portion 56 of L-shaped stop member 52 is provided with a slot 57 to receive lever 47 at a point above the pivotal axis thereof to maintain lever 47 in position during normal operation of the tractor. Stop member 52 is preferably canted somewhat in a rearward direction so that lever 47 will be disposed substantially at right angles to longitudinal frame member 7, when lever 47 is received in slot 57.

A coil spring 58 surrounds bolt 48 and continuously urges lever 47 toward its outermost limit, which will clear the stop member 52, as shown by dot and dash lines in FIG. 5.

The upper end of lever 47 is apertured as at 59 to receive one end of an elongated flexible member 61. The other end of elongated flexible member 61 is secured on the tractor 1 at a point within easy reach of the operator. By grasping and pulling flexible member 61, the lever 47 will be rotated in a counter-clockwise direction to dislodge it from slot 57 and permit spring 58 to automatically move the lever laterally along its pivotal axis to its outermost stop clearing position.

Lever 47 is also preferably provided with an aperture 62 at its lower end for the securing thereto of one end of flexible member 44. The other end of flexible member 44 is secured to a motion multiplier comprising a lever arm 63 pivotally mounted on the tractor as by one of the bolts 64 maintaining in position the brake pedal 66. The lever arm 63 may be provided with an aperture 67 at a point spaced from the pivotal connection of lever arm 63 with the tractor for securing flexible member 44 thereto.

Flexible member 46 is secured to lever arm 63 through an aperture 68 located at a point on the same slide of the pivotal axis as the point of attachment of the elongated flexible member 44 to the lever arm but spaced a greater distance from the pivotal axis. Flexible member 46 is trained over an idler pulley 69 secured to the tractor frame below clutch pedal 2 by any suitable means such as a bracket 71, which in turn may be secured to the tractor 1 by any suitable means such as the bolt 72. The end of elongated flexible member 46 remote from its point of attachment to lever arm 63 is secured to clutch pedal 2 by means of a clevis 73.

The combined lengths of the elongated flexible members 44 and 46 are such that there will always be sufficient slack to permit the swinging of the implement carrying frame relative to the tractor, which occurs during normal operation, without causing clutch release. This slack is taken up by a coil spring 74, which is not sufficiently strong to overcome the conventional clutch engaging springs, but which will insure the maintaining of the lever 47 in slot 57 until it is manually withdrawn. The coil spring 74 is preferably installed in elongated flexible member 44, being secured at spaced points 76 and 77.

With the above description in mind, the operation of the safety device of the present invention will be readily apparent. With the lever 47 received in slot 57 and with the rod 19 and guide tube 17 in normal extended position, the tractor will operate as any tractor having the conventional lower draft and upper compression link system, described earlier, until the plow or other implement strikes an object, which will not yield, and thus exerts an abnormal compressive force on the upper link 9. If this force exceeds a predetermined minimum, the ball 33 will be dislodged from recess 32 and the rod and tube will telescope, shortening the effective length of upper link 9 and causing upward swinging movement of the implement frame 3 relative to tractor 1.

After taking out the slack in elongated flexible members 46 and 44 by extension of coil spring 74, the upward swinging movement of implement frame 3 will be transmitted to clutch pedal 2 by these flexible members, the movement of the implement frame relative to the tractor being multiplied in movement of the clutch pedal because of the inclusion in the transmission chain of the lever arm 63. Thus, almost instantaneously with the striking of an immovable object, the clutch pedal of the tractor motor is depressed sufficiently to release the clutch and prevent the excessive shock, which would otherwise occur.

It is obvious that in tractors of the type in which the pump of the hydraulic lifting system is driven by the lay shaft of the transmission, the operator could not actuate the lift mechanism to lift the plow after the safety device had gone into operation and the clutch released. However, in the construction described, it is only necessary for the operator, after neutralizing the transmission, to exert pressure on clutch pedal 2 to relieve the strain and then pull on the flexible member 61, which will withdraw lever 47 from slot 57. The lever 47 will then be forced outwardly by spring 58 to a stop clearing position to that when the flexible member 61 is released, the clutch will be automatically reengaged. The operator can then operate the hydraulic controls in the usual manner to lift the plow, if necessary, first backing up the tractor to clear the obstruction. Lifting of the plow will automatically, because of the weight of the plow, cause the rod 19 to withdraw from guide tube 17 until ball 33 drops into recess 32. It is then only necessary to reset lever 47 in slot 57 and the normal plowing operation can be resumed.

It will be understood, of course, that for tractors in which the hydraulic pump is operating at all times that the tractor motor is running, the clutch reengaging mechanism, described above, is not necessary and the flexible member 44 can be secured directly to the implement carrying frame or to a member secured rigidly thereon, since the hydraulic mechanism could be actuated to lift the plow or other implement without reengaging the clutch.

I claim:

1. A safety device for a tractor having a pedal actuated clutch and an implement carrying frame mounted thereon for vertical swinging movement by upper and lower link members, comprising: a link serving as said upper link member, the effective length of which is shortened upon application of a predetermined compressive force to permit said frame to swing upwardly with respect to said tractor; a lever pivotally mounted intermediate its ends on said frame, said lever having limited lateral movement along its pivotal axis; a stop member having a slot formed therein secured to said frame so that, in one position, said lever is received in said slot at a point above the pivotal axis of said lever and held against pivotal movement in one direction and, in another position, said lever will clear said stop means; guide means secured to said tractor below said clutch pedal; and an elongated flexible means trained over said guide means and secured to said clutch pedal and to said lever at a point below its pivotal axis, the arrangement being such that when said lever is received in said slot, upward movement of said frame relative to said tractor causes clutch disengaging movement of said clutch pedal, said clutch being reengageable while said frame is in an elevated position by dislodgment of said lever from said slot and movement of said lever laterally to a stop-clearing position.

2. The device defined by claim 1 further including spring means between said lever and said frame tending to urge said lever toward a stop-clearing position.

3. A safety device for a tractor having a pedal actuated clutch and an implement carrying frame mounted thereon for vertical swinging movement by upper and lower link members, comprising: a link serving as said upper link member, the effective length of which is shortened upon application of a predetermined compressive force to permit said frame to swing upwardly with respect to said tractor; a motion-multiplier including a lever arm pivotally mounted on said tractor intermediate said frame and said clutch pedal; guide means secured to said tractor below said clutch pedal; a first elongated flexible member secured at one end to said frame and at the other end to said lever arm at a point spaced from its pivotal axis; and a second elongated flexible member secured at its one end to said lever arm and at its other end to said clutch pedal, the point of attachment of said second flexible member to said lever arm being on the same side of the pivotal axis as the point of attachment of said first elongated flexible member but spaced a greater distance from the pivotal axis, said second elongated flexible member being trained over said guide means and the arrangement being such that upward movement of said frame relative to said tractor causes clutch disengaging movement of said clutch pedal.

4. A safety device for a tractor having a pedal actuated clutch and an implement carrying frame mounted thereon for vertical swinging movement by upper and lower link members, comprising: a link serving as said upper link member, the effective length of which is shortened upon application of a predetermined compressive force to permit said frame to swing upwardly with respect to said tractor; a lever pivotally mounted intermediate its ends on said frame, said lever having limited lateral movement along its pivotal axis; a stop member having a slot formed therein secured to said frame so that, in one position, said lever is received in said slot at a point above the pivotal axis of said lever and held against pivotal movement in one direction and, in another position, said lever will clear said stop means; a spring between said lever and said frame tending to urge said lever to a stop-clearing position; a motion-multiplier including a lever arm pivotally mounted on said tractor intermediate said frame and said clutch pedal; guide means secured to said tractor below said clutch pedal; a first elongated flexible member secured at one end to said lever at a point below its pivotal axis and at the other end to said motion-multiplier lever arm at a point spaced from its pivotal axis; and a second elongated flexible member secured at its one end to said lever arm and at its other end to said clutch pedal, the point of attachment of said second flexible member to said lever arm being on the same side of the pivotal axis as the point of attachment of said first elongated flexible member, but spaced a greater distance from the pivotal axis, said second elongated flexible member being trained over said guide means and the arrangement being such that upward movement of said frame relative to said tractor causes clutch disengaging movement of said clutch pedal and with clutch reengagement, while said frame is in an elevated position, being effected by dislodging said lever from said slot, said spring thereupon moving said lever to a stop-clearing position.

References Cited in the file of this patent

UNITED STATES PATENTS

| | | |
|---|---|---|
| 1,347,589 | Ramos et al. | July 27, 1920 |
| 1,531,326 | White | Mar. 31, 1925 |
| 1,582,754 | Ing | Apr. 27, 1926 |
| 1,652,345 | Brinkman | Dec. 13, 1927 |
| 1,935,707 | Glabus | Nov. 21, 1933 |
| 2,294,188 | Kuntz | Aug. 25, 1942 |
| 2,562,817 | Pethick | July 31, 1951 |
| 2,689,619 | Hitchcock | Sept. 21, 1954 |
| 2,888,083 | Benson | May 26, 1959 |

FOREIGN PATENTS

| | | |
|---|---|---|
| 568,928 | Great Britain | Apr. 26, 1945 |